United States Patent
Chung et al.

(10) Patent No.: US 9,634,357 B2
(45) Date of Patent: Apr. 25, 2017

(54) HYBRID TYPE SECONDARY BATTERY INCLUDING ELECTRODES HAVING DIFFERENT OUTPUT AND CAPACITY PROPERTIES

(71) Applicant: LG Chem, Ltd., Seoul (KR)

(72) Inventors: Seunghyun Chung, Daejeon (KR); Geun Chang Chung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/035,612

(22) PCT Filed: Nov. 19, 2014

(86) PCT No.: PCT/KR2014/011099
§ 371 (c)(1),
(2) Date: May 10, 2016

(87) PCT Pub. No.: WO2015/083954
PCT Pub. Date: Jun. 11, 2015

(65) Prior Publication Data
US 2016/0276703 A1  Sep. 22, 2016

(30) Foreign Application Priority Data

Dec. 3, 2013 (KR) .......................... 10-2013-0148902

(51) Int. Cl.
*H01M 4/38* (2006.01)
*H01M 4/505* (2010.01)
(Continued)

(52) U.S. Cl.
CPC ......... *H01M 10/058* (2013.01); *H01M 4/386* (2013.01); *H01M 4/387* (2013.01);
(Continued)

(58) Field of Classification Search
CPC ...... H01M 4/386; H01M 4/387; H01M 4/483; H01M 4/505; H01M 4/525; H01M 4/58;
(Continued)

(56) References Cited

U.S. PATENT DOCUMENTS

2003/0035982 A1  2/2003  Ryu et al.
2012/0015223 A1  1/2012  Bhardwaj et al.

FOREIGN PATENT DOCUMENTS

KR  20030014988 A  2/2003
KR  2009-0110469 A  10/2009
(Continued)

OTHER PUBLICATIONS

International Search Report from PCT/KR2014/011099, dated Mar. 20, 2015.

*Primary Examiner* — Brittany Raymond
(74) *Attorney, Agent, or Firm* — Lerner, David, Littenberg, Krumholz & Mentlik, LLP

(57) ABSTRACT

Disclosed herein is a battery cell having an electrode assembly, including a positive electrode, a negative electrode, and a separator interposed between the positive electrode and the negative electrode, mounted in a receiving part of a battery case, wherein a positive electrode terminal and a negative electrode terminal protrude from at least one side of the electrode assembly, and an insulative material is provided between the electrode assembly and the battery case.

22 Claims, 4 Drawing Sheets

(51) Int. Cl.
*H01M 4/525* (2010.01)
*H01M 4/58* (2010.01)
*H01M 4/583* (2010.01)
*H01M 10/058* (2010.01)
*H01M 10/04* (2006.01)
*H01M 4/48* (2010.01)

(52) U.S. Cl.
CPC ........... *H01M 4/505* (2013.01); *H01M 4/525* (2013.01); *H01M 4/583* (2013.01); *H01M 4/5825* (2013.01); *H01M 10/04* (2013.01); *H01M 4/483* (2013.01); *H01M 4/58* (2013.01)

(58) Field of Classification Search
CPC .... H01M 4/5825; H01M 4/583; H01M 10/04; H01M 10/058
See application file for complete search history.

(56) References Cited

FOREIGN PATENT DOCUMENTS

| | | |
|---|---|---|
| KR | 20100071786 A | 6/2010 |
| KR | 20130038795 A | 4/2013 |

US 9,634,357 B2

HYBRID TYPE SECONDARY BATTERY INCLUDING ELECTRODES HAVING DIFFERENT OUTPUT AND CAPACITY PROPERTIES

CROSS-REFERENCE TO RELATED APPLICATION

This application is a national phase entry under 35 U.S.C. §371 of International Application No. PCT/KR2014/011099, filed Nov. 19, 2014, which claims priority to Korean Patent Application No. 10-2013-0148902, filed Dec. 3, 2013, the disclosures of which are incorporated herein by reference.

TECHNICAL FIELD

The present invention relates to a secondary battery having an electrode assembly, including at least one positive electrode, at least one negative electrode, and at least one separator interposed between the positive electrode and the negative electrode, mounted in a battery case, wherein positive electrodes and negative electrodes having different output and capacity properties are provided in combination of a positive electrode and a negative electrode, positive electrode materials added to opposite major surfaces of a positive electrode current collector exhibit different output and capacity properties, negative electrode materials added to opposite major surfaces of a negative electrode current collector exhibit different output and capacity properties, and, in the positive electrode and the negative electrode, which face each other in a state in which the separator is interposed between the positive electrode and the negative electrode, the positive electrode material added to one major surface of the positive electrode current collector facing the separator and the negative electrode material added to one major surface of the negative electrode current collector facing the separator exhibit higher capacities or lower capacities than the electrode materials added to the other major surfaces of the electrode current collectors in combination of the positive electrode and the negative electrode.

BACKGROUND ART

In recent years, as mobile devices have been increasingly developed, and the demand for such mobile devices has increased, the demand for secondary batteries, which can be charged and discharged, as an energy source for the mobile devices has also sharply increased. As a result, much research has been carried out into a secondary battery that is capable of satisfying the wide variety of demands. In addition, the secondary battery has also attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles, which use fossil fuels.

Consequently, electric vehicles (EV), which can be driven using only a battery, and hybrid electric vehicles (HEV), which uses both a battery and an engine, have been developed, and some of the electric vehicles (EV) and the hybrid electric vehicles (HEV) have now been commercialized. Nickel-metal hydride (Ni-MH) secondary batteries have been mainly used as a power source for the electric vehicles (EV) and the hybrid electric vehicles (HEV). In recent years, on the other hand, much research has also been carried out into lithium secondary batteries having high energy density, discharge voltage, and output stability, and some of the lithium secondary batteries have now been commercialized.

In order for the secondary battery to be used as a power source of a device, such as an electric vehicle (EV) or a hybrid electric vehicle (HEV), or a system that has various driving states, it is necessary for the secondary battery to have various output and capacity properties corresponding to the driving states of the device or the system. To this end, a hybrid-type battery pack, which is configured to have a structure in which a plurality of high-output, low-capacity secondary batteries and a plurality of low-output, high-capacity secondary batteries are included as unit cells, and in which the unit cells are connected to each other in series and/or in parallel, has been proposed.

FIG. 1 is a typical view showing an electrode assembly that constitutes a high-output, low-capacity secondary battery, which is received in the above-described hybrid-type battery pack.

Referring to FIG. 1, an electrode assembly 100 that constitutes a high-output, low-capacity secondary battery includes a positive electrode 110, which includes a positive electrode current collector 111 and high-output, low-capacity positive electrode materials 112 and 113 added to opposite main surfaces of the positive electrode current collector 111, a negative electrode 120, which includes a negative electrode current collector 121 and high-output, low-capacity negative electrode materials 122 and 123 added to opposite main surfaces of the negative electrode current collector 121, and a separator 130 interposed between the positive electrode 110 and the negative electrode 120. As a result, the electrode assembly 100 exhibits high-output, low-capacity properties.

FIG. 2 is a typical view showing an electrode assembly that constitutes a low-output, high-capacity secondary battery, which is received in the above-described hybrid-type battery pack.

Referring to FIG. 2, an electrode assembly 200 that constitutes a low-output, high-capacity secondary battery includes a positive electrode 210, which includes a positive electrode current collector 211 and low-output, high-capacity positive electrode materials 212 and 213 added to opposite main surfaces of the positive electrode current collector 211, a negative electrode 220, which includes a negative electrode current collector 221 and low-output, high-capacity negative electrode materials 222 and 223 added to opposite main surfaces of the negative electrode current collector 221, and a separator 230 interposed between the positive electrode 210 and the negative electrode 220. As a result, the electrode assembly 200 exhibits low-output, high-capacity properties.

That is, the conventional hybrid-type battery pack includes a secondary battery that exhibits high-output, low-capacity properties and a secondary battery that exhibits low-output, high-capacity properties such that the battery pack can operate appropriately for various driving states of a device that uses the battery pack as a power source.

FIG. 3 is a typical view showing a hybrid-type battery pack including a plurality of secondary batteries having different outputs and capacities.

Referring to FIG. 3, a hybrid-type battery pack 300 is configured to have a structure in which high-output, low-capacity secondary batteries 302 and low-output, high-capacity secondary batteries 303 are mounted in a pack case 301 as unit cells such that the secondary batteries operate independently depending upon the output and capacity properties thereof, and in which the secondary batteries are connected to each other via electrode terminal connection parts 304.

In a device that uses the battery pack 300, however, an initial driving condition is generally different from other driving conditions. The secondary batteries 302 and 303, which constitute the battery pack 300, have different self-discharge rates. As a result, the remaining capacities of the secondary batteries 302 and 303 may vary over time.

In order to overcome the imbalance in capacity between the secondary batteries having different outputs and capacities and to improve the safety, lifespan, output, and capacity properties of the secondary batteries, therefore, cell balancing current 305 flows between the high-output, low-capacity secondary batteries 302 and the low-output, high-capacity secondary batteries 303 such that voltages of the secondary batteries are made uniform.

Since the secondary batteries 302 and 303 are connected to each other in series and/or in parallel as unit cells via electrode terminals in an independent state depending upon the output and capacity properties of the battery pack, however, the cell balancing current 305 flows through the electrode terminal connection parts 304, via which the secondary batteries 302 and 303 are connected to each other. In this case, heat is generated at the electrode terminal connection parts 304 due to high resistance when the cell balancing current 305 continuously flows through the electrode terminal connection parts 304. If the heat is not effectively dissipated, but is allowed to accumulate, the batteries may be deteriorated, with the result that the durability and safety of the secondary batteries may be greatly reduced.

Therefore, there is a high necessity for technology that is capable of fundamentally solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that, in a case in which a secondary battery is configured such that electrode materials added to the opposite major surfaces of an electrode current collector exhibit different output and capacity properties and such that electrode materials added to one major surface of a positive electrode current collector and to one major surface of a negative electrode current collector, which faces the positive electrode current collector in a state in which a separator is interposed between the positive electrode current collector and the negative electrode current collector, exhibit higher capacities or lower capacities than electrode materials added to the other major surface of the positive electrode current collector and to the other major surface of the negative electrode current collector, cell balancing current, which flows between secondary batteries, flows directly through the electrode current collectors, not via electrode terminal connection parts, whereby it is possible to prevent deterioration of the secondary battery attributable to heat generated from electrode terminal connection parts and cell connection parts due to cell balancing current in a conventional hybrid-type battery pack, to improve the safety and durability of the secondary battery, and to prevent the loss of energy due to the resistance in the electrode terminal connection parts and the cell connection parts.

Technical Solution

In accordance with one aspect of the present invention, the above and other objects can be accomplished by the provision of a secondary battery having an electrode assembly, including at least one positive electrode, at least one negative electrode, and at least one separator interposed between the positive electrode and the negative electrode, mounted in a battery case, wherein positive electrodes and negative electrodes having different output and capacity properties are provided in combination of a positive electrodes and a negative electrodes, positive electrode materials added to opposite major surfaces of a positive electrode current collector exhibit different output and capacity properties, negative electrode materials added to opposite major surfaces of a negative electrode current collector exhibit different output and capacity properties, and, in the positive electrode and the negative electrode, which face each other in a state in which the separator is interposed between the positive electrode and the negative electrode, the positive electrode material added to one major surface of the positive electrode current collector facing the separator and the negative electrode material added to one major surface of the negative electrode current collector facing the separator exhibit higher capacities or lower capacities than the electrode materials added to the other major surfaces of the electrode current collectors in combination of the positive electrode and the negative electrode.

The electrode assembly of the secondary battery according to the present invention is configured such that the electrode materials added to the opposite major surfaces of the electrode current collector exhibit different output and capacity properties and such that the electrode materials added to one major surface of the positive electrode current collector and to one major surface of the negative electrode current collector, which faces the positive electrode current collector in a state in which the separator is interposed between the positive electrode current collector and the negative electrode current collector, exhibit higher capacities or lower capacities than the electrode materials added to the other major surface of the positive electrode current collector and to the other major surface of the negative electrode current collector. As a result, cell balancing current, which flows between the secondary batteries, flows directly through the electrode current collectors, not via electrode terminal connection parts. Consequently, it is possible to prevent deterioration of the secondary battery attributable to heat generated at the electrode terminal connection parts, to improve the safety and durability of the secondary battery, and to prevent the loss of energy due to the resistance of the electrode terminal connection parts.

The terms 'positive electrode material' and 'negative electrode material' used in this specification do not refer only to kinds of materials, but also mean a positive electrode material and a negative electrode material configured to exhibit desired output and capacity properties based on a combination of a coating method, porosity, a coating amount, and a mixing ratio, including the kind of the positive electrode material and the negative electrode material.

The structure of the electrode assembly of the secondary battery is not particularly restricted so long as the electrode assembly is configured as described above. For example, the electrode assembly may be configured to have a wound type structure, a stacked type structure, a stacked and folded type structure, or a laminated and stacked type structure.

The electrode assembly configured to have the laminated and stacked type structure is an electrode assembly configured such that a radical cell is configured to have a structure in which a negative electrode, a separator, a positive electrode, and a separator are sequentially stacked or a structure in which a positive electrode, a separator, a negative electrode, and a separator are sequentially stacked, and such that one or more radical cells are stacked. In a case in which a plurality of radical cells is stacked to constitute the electrode assembly, a radical final cell, which is configured to have a structure in which a separator, a negative electrode, and a separator are sequentially stacked, may be stacked on the uppermost end of the structure in which the radical cells are stacked.

In a case in which the electrode assembly configured to have the laminated and stacked type structure is used, it is possible to manufacture the secondary battery through a simple stacking process, not through a folding process, thereby simplifying the process and reducing the cost for manufacturing the secondary battery, unlike the case in which the electrode assembly configured to have the stacked and folded type structure is used.

The electrode assemblies configured to have the wound type structure, the stacked type structure, and the stacked and folded type structure are well known in the art to which the present invention pertains, and therefore a detailed description thereof will be omitted.

In a concrete example, the positive electrode constituting the electrode assembly of the secondary battery according to the present invention may include a relatively high-output, low-capacity positive electrode material added to one main surface of the positive electrode current collector and a relatively low-output, high-capacity positive electrode material added to the other main surface of the positive electrode current collector, and the negative electrode constituting the electrode assembly of the secondary battery according to the present invention may include a relatively high-output, low-capacity negative electrode material added to one main surface of the negative electrode current collector and a relatively low-output, high-capacity negative electrode material added to the other main surface of the negative electrode current collector.

That is, the positive electrode and the negative electrode include electrode materials having different outputs and capacities added to the opposite major surfaces of the electrode current collectors such that a single secondary battery has both the high-output and low-capacity properties and the low-output and high-capacity properties.

In another concrete example, the electrode assembly of the secondary battery according to the present invention may be configured such that one major surface (a) of the positive electrode, to which the relatively high-output, low-capacity positive electrode material is added, and one major surface (b) of the negative electrode, to which the relatively high-output, low-capacity negative electrode material is added, face each other in a state in which the separator is interposed between the one major surface (a) of the positive electrode and the one major surface (b) of the negative electrode.

In addition, the electrode assembly of the secondary battery may be configured such that the other major surface (c) of the positive electrode, to which the relatively low-output, high-capacity positive electrode material is added, and the other major surface (d) of the negative electrode, to which the relatively low-output, high-capacity negative electrode material is added, face each other in a state in which the separator is interposed between the other major surface (c) of the positive electrode and the other major surface (d) of the negative electrode.

That is, in the combination of the positive electrode and the negative electrode, which face each other in a state in which the separator is interposed between the positive electrode and the negative electrode, the positive electrode material added to one major surface of the positive electrode current collector facing the separator and the negative electrode material added to one major surface of the negative electrode current collector facing the separator exhibit higher outputs and lower capacities or lower outputs and higher capacities than the electrode materials added to the other major surfaces of the electrode current collectors. As a result, cell balancing current, which flows between secondary batteries having different outputs and capacities, flows directly through the electrode current collectors, not via the electrode terminal connection parts. Consequently, it is possible to prevent the deterioration of the secondary battery owing to heat generated from the electrode terminal connection parts, to improve the safety and durability of the secondary battery, and to prevent the loss of energy due to the resistance of the electrode terminal connection parts.

In a concrete example, the electrode materials exhibiting different output and capacity properties may be different from each other in terms of kind of the electrode materials, a coating method, porosity, a coating amount, or a mixing ratio.

In other words, regardless of whether the electrode assembly of the secondary battery according to the present invention is configured such that either different kinds of electrode materials or the same kind of electrode materials are added to the opposite major surfaces of the electrode current collectors in order to exhibit different output and capacity properties, it is possible to achieve desired effects by varying the coating method, the porosity, the coating amount, or the mixing ratio.

More specifically, the relatively high-output, low-capacity positive electrode material may be at least one selected from a group consisting of lithium manganese oxide (LMO), lithium iron phosphate (LFP), lithium nickel manganese cobalt oxide (NMC), and lithium nickel cobalt aluminum oxide (NCA).

On the other hand, the relatively low-output, high-capacity positive electrode material may be at least one selected from a group consisting of lithium cobalt oxide (LCO), lithium nickel manganese cobalt oxide, lithium nickel cobalt aluminum oxide, and over-lithiated oxide (OLO). The kinds of the high-output, low-capacity positive electrode material and the low-output, high-capacity positive electrode material added to the opposite major surfaces of the positive electrode current collector may be different from each other such that the positive electrode exhibits different output and capacity properties.

In addition, in the case in which the high-output, low-capacity positive electrode material and the low-output, high-capacity positive electrode material added to the opposite major surfaces of the positive electrode current collector are identical in kind to each other, the relatively high-output, low-capacity positive electrode material may have higher porosity than the relatively low-output, high-capacity positive electrode material, or a smaller amount of the relatively high-output, low-capacity positive electrode material than the relatively low-output, high-capacity positive electrode material may be coated on the positive electrode current collector, thereby realizing different output and capacity properties.

Specifically, in the case in which the relatively high-output, low-capacity positive electrode material and the relatively low-output, high-capacity positive electrode material are identical in kind to each other, the porosity of the relatively high-output, low-capacity positive electrode material may be 110% to 300% of the porosity of the relatively low-output, high-capacity positive electrode material, or the amount of the relatively high-output, low-capacity positive electrode material coated on the positive electrode current collector may be 50% to 90% the amount of the relatively low-output, high-capacity positive electrode material coated on the positive electrode current collector.

If the porosity of the high-output, low-capacity positive electrode material is less than 110% the porosity of the low-output, high-capacity positive electrode material, or if the amount of the high-output, low-capacity positive electrode material coated on the positive electrode current collector is more than 90% the amount of the low-output, high-capacity positive electrode material coated on the positive electrode current collector, the difference in output and capacity properties between the high-output, low-capacity positive electrode material and the low-output, high-capacity positive electrode material may not be sufficient to achieve desired cell balancing current effects.

On the other hand, if the porosity of the high-output, low-capacity positive electrode material is more than 300% the porosity of the low-output, high-capacity positive electrode material, or if the amount of the high-output, low-capacity positive electrode material coated on the positive electrode current collector is less than 50% the amount of the low-output, high-capacity positive electrode material coated on the positive electrode current collector, the high-output, low-capacity positive electrode material may not exhibit desired electrical properties.

In another concrete example, the relatively high-output, low-capacity negative electrode material may be at least one selected from a group consisting of amorphous carbon and a graphite-based negative electrode material. On the other hand, the relatively low-output, high-capacity negative electrode material may be at least one selected from a group consisting of a graphite-based negative electrode material, a silicon (Si)-based negative electrode material, and a tin (Sn)-based negative electrode material. The kinds of the high-output, low-capacity negative electrode material and the low-output, high-capacity negative electrode material added to the opposite major surfaces of the negative electrode current collector may be different from each other such that the negative electrode exhibits different output and capacity properties.

In addition, in the case in which the high-output, low-capacity negative electrode material and the low-output, high-capacity negative electrode material added to the opposite major surfaces of the negative electrode current collector are identical in kind to each other, the relatively high-output, low-capacity negative electrode material may have higher porosity than the relatively low-output, high-capacity negative electrode material, or a smaller amount of the relatively high-output, low-capacity negative electrode material than the relatively low-output, high-capacity negative electrode material may be coated on the negative electrode current collector, thereby realizing different output and capacity properties.

Specifically, in the case in which the relatively high-output, low-capacity negative electrode material and the relatively low-output, high-capacity negative electrode material are identical in kind to each other, the porosity of the relatively high-output, low-capacity negative electrode material may be 110% to 300% of the porosity than the relatively low-output, high-capacity negative electrode material, or the amount of the relatively high-output, low-capacity negative electrode material coated on the negative electrode current collector may be 50% to 90% of the amount of the relatively low-output, high-capacity negative electrode material coated on the negative electrode current collector.

If the porosity of the high-output, low-capacity negative electrode material is less than 110% of the porosity of the low-output, high-capacity negative electrode material, or if the amount of the high-output, low-capacity negative electrode material coated on the negative electrode current collector is more than 90% of the amount of the low-output, high-capacity negative electrode material coated on the negative electrode current collector, the difference in output and capacity properties between the high-output, low-capacity negative electrode material and the low-output, high-capacity negative electrode material may not be sufficient to achieve desired cell balancing current effects.

On the other hand, if the porosity of the high-output, low-capacity negative electrode material is more than 300% of the porosity of the low-output, high-capacity negative electrode material, or if the amount of the high-output, low-capacity negative electrode material coated on the negative electrode current collector is less than 50% of the amount of the low-output, high-capacity negative electrode material coated on the negative electrode current collector, the high-output, low-capacity negative electrode material may not exhibit desired electrical properties.

Here, the positive electrode material or the negative electrode material is not particularly restricted so long as the positive electrode material or the negative electrode material exhibits the output and capacity properties described above, thereby achieving desired effects. For example, the positive electrode material or the negative electrode material may be at least one selected from among an electrode material for nickel metal hydride secondary batteries, an electrode material for nickel cadmium secondary batteries, and an electrode material for capacitors.

In this case, when the positive electrode material or the negative electrode material is added to the electrode current collector, an adhesive material for increasing adhesion force between the positive electrode material or the negative electrode material and the electrode current collector may be further added to the electrode current collector.

In another concrete example, the electrode assembly may be manufactured through a manufacturing process including high-temperature, high-pressure pressing. Consequently, it is possible to improve adhesion between the electrode materials, the electrode current collectors, and the separator and to improve the durability of the battery.

In addition, the separator constituting the electrode assembly of the secondary battery according to the present invention may include one or more kinds of separators.

Specifically, in the combination of the positive electrode and the negative electrode, a separator, interposed between one major surface of the positive electrode current collector to which the high-output, low-capacity positive electrode material is added and one major surface of the negative electrode current collector to which the high-output, low-capacity negative electrode material is added, and another separator, interposed between one major surface of the positive electrode current collector to which the low-output, high-capacity positive electrode material is added and one major surface of the negative electrode current collector to which the low-output, high-capacity negative electrode material is added, may be identical in kind to each other, or may be different in kind from each other, based on the output and capacity properties of the electrode materials.

In accordance with another aspect of the present invention, there is provided a battery pack including the secondary battery with the above-stated construction as a unit cell.

In a concrete example, the battery pack may further include a cooling member for effectively removing heat that is generated from the secondary battery.

In accordance with a further aspect of the present invention, there is provided a device including the battery pack. Specifically, the device may be selected from a group consisting of a laptop computer, a mobile phone, a portable display player (PDP), a portable multimedia player (PMP), an MP3 player, a digital still camera (DSC), a digital video recorder (DVR), a smartphone, a global positioning system (GPS), a camcorder, an electric vehicle, a hybrid electric vehicle, a plug-in hybrid electric vehicle, and a power storage device.

The structure and manufacturing method of the device are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
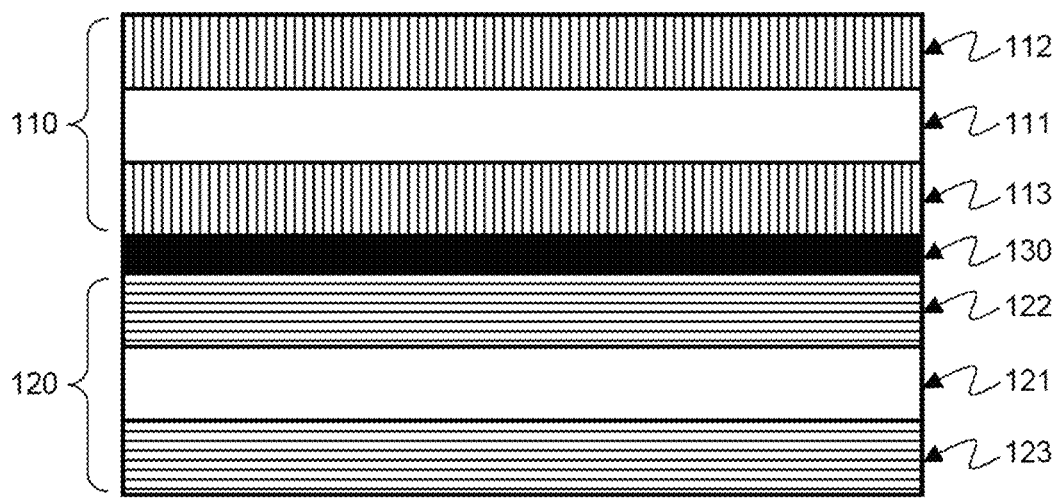
FIG. 1 is a typical view showing an electrode assembly that constitutes a high-output, low-capacity secondary battery, which is received in a conventional hybrid-type battery pack as a unit cell.
Figure 2:
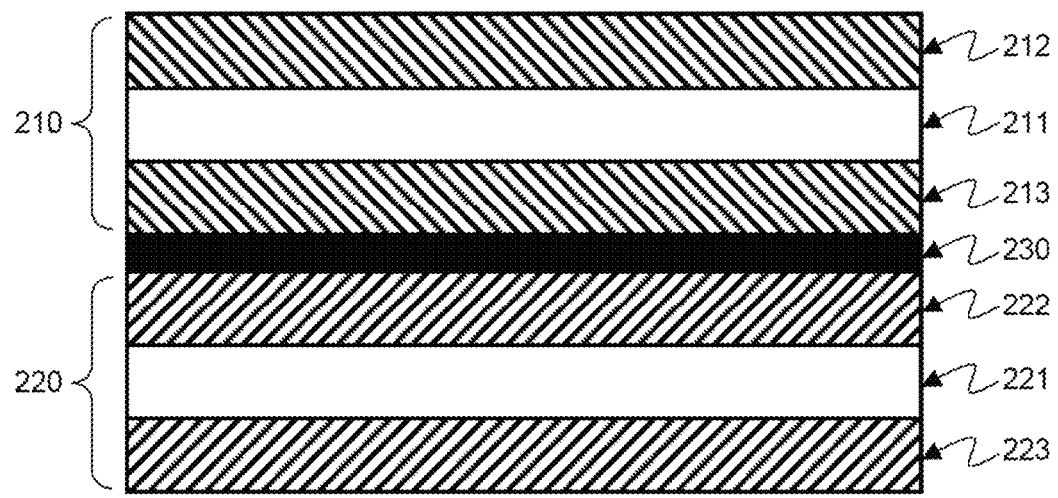
FIG. 2 is a typical view showing an electrode assembly that constitutes a low-output, high-capacity secondary battery, which is received in a conventional hybrid-type battery pack as a unit cell.
Figure 3:
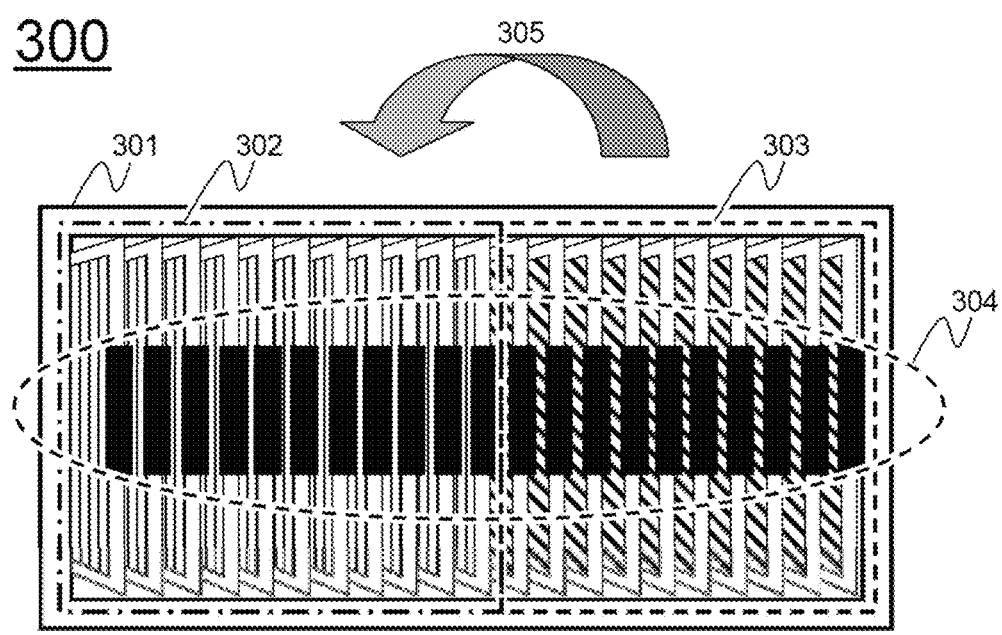
FIG. 3 is a typical view showing a conventional hybrid-type battery pack including secondary batteries that are constituted by a plurality of electrode assemblies having different outputs and capacities.
Figure 4:
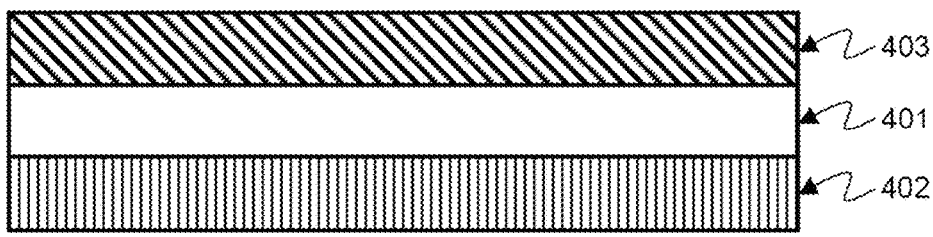
FIG. 4 is a typical view showing a positive electrode that constitutes an electrode assembly of a secondary battery according to an embodiment of the present invention.
Figure 5:
FIG. 5 is a typical view showing a negative electrode that constitutes an electrode assembly of a secondary battery according to another embodiment of the present invention.

FIGS. 4 and 5 are typical views respectively showing a positive electrode and a negative electrode that constitute an electrode assembly of a secondary battery according to an embodiment of the present invention.

Referring first to FIG. 4, a positive electrode 400 that constitutes an electrode assembly of a secondary battery according to the present invention includes a positive electrode current collector 401, a relatively high-output, low-capacity positive electrode material 402 added to one main surface of the positive electrode current collector 401, and a relatively low-output, high-capacity positive electrode material 403 added to the other main surface of the positive electrode current collector 401. The relatively high-output, low-capacity positive electrode material and the relatively low-output, high-capacity positive electrode material may be different in kind from each other. Alternatively, the relatively high-output, low-capacity positive electrode material and the relatively low-output, high-capacity positive electrode material may be identical in kind to each other. In this case, the relatively high-output, low-capacity positive electrode material may have higher porosity than the relatively low-output, high-capacity positive electrode material, or a smaller amount of the relatively high-output, low-capacity positive electrode material than that of the relatively low-output, high-capacity positive electrode material may be coated on the positive electrode current collector, thereby achieving desired effects.

Referring to FIG. 5, on the other hand, a negative electrode 500 that constitutes an electrode assembly of a secondary battery according to the present invention includes a negative electrode current collector 501, a relatively high-output, low-capacity negative electrode material 502 added to one main surface of the negative electrode current collector 501, and a relatively low-output, high-capacity negative electrode material 503 added to the other main surface of the negative electrode current collector 501. The relatively high-output, low-capacity negative electrode material and the relatively low-output, high-capacity negative electrode material may be different in kind from each other. Alternatively, the relatively high-output, low-capacity negative electrode material and the relatively low-output, high-capacity negative electrode material may be identical in kind to each other. In this case, the relatively high-output, low-capacity negative electrode material may have higher porosity than the relatively low-output, high-capacity negative electrode material, or a smaller amount of the relatively high-output, low-capacity negative electrode material than that of the relatively low-output, high-capacity negative electrode material may be coated on the negative electrode current collector, thereby achieving desired effects.

That is, the positive electrode 400 and the negative electrode 500, which constitute the electrode assembly of the secondary battery according to the present invention, include the electrode materials 402, 403, 502, and 503 having different outputs and capacities, which are added to the opposite major surfaces of the electrode current collectors 401 and 501, such that a single secondary battery has both high-output, low-capacity properties and low-output, high-capacity properties.

Figure 6:
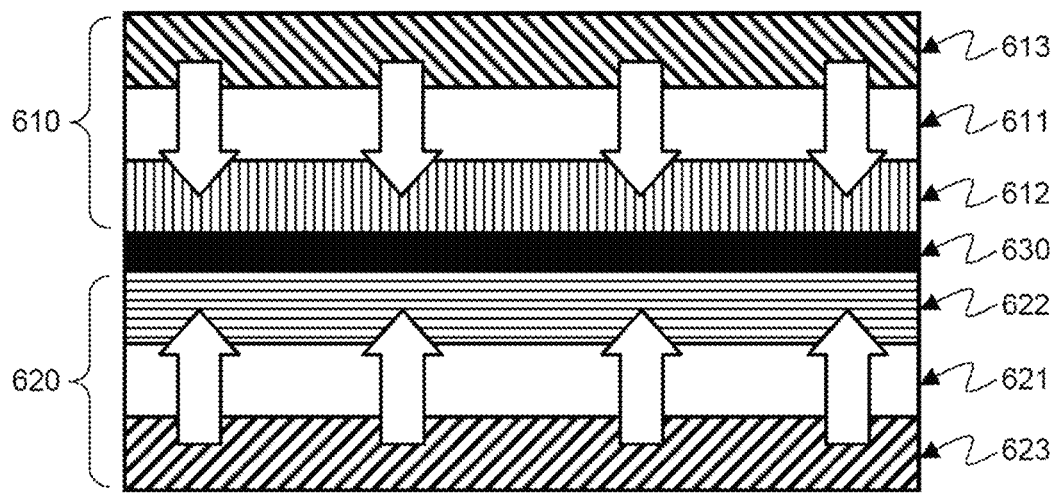
FIG. 6 is a typical view showing an electrode assembly that constitutes a secondary battery according to an embodiment of the present invention.

FIG. 6 is a typical view showing an electrode assembly that constitutes a secondary battery according to an embodiment of the present invention. The electrode assembly shown in this figure includes the positive electrode and the negative electrode shown in FIGS. 4 and 5.

Referring to FIG. 6, an electrode assembly 600 of the secondary battery includes a positive electrode 610, a negative electrode 620, and a separator 630 interposed between the positive electrode 610 and the negative electrode 620. The positive electrode 610 includes a positive electrode current collector 611, a relatively high-output, low-capacity positive electrode material 612 added to one main surface of the positive electrode current collector 611, and a relatively low-output, high-capacity positive electrode material 613 added to the other main surface of the positive electrode current collector 611. The negative electrode 620 includes a negative electrode current collector 621, a relatively high-output, low-capacity negative electrode material 622 added to one main surface of the negative electrode current collector 621, and a relatively low-output, high-capacity negative electrode material 623 added to the other main surface of the negative electrode current collector 621.

Specifically, in the positive electrode 610 and the negative electrode 620, which face each other in a state in which the separator 630 is interposed between the positive electrode 610 and the negative electrode 620, the positive electrode material 612 added to one major surface of the positive electrode current collector 611 facing the separator 630 and the negative electrode material 622 added to one major surface of the negative electrode current collector 621 facing the separator 630 exhibit higher outputs and lower capacities than the electrode materials 613 and 623 added to the other major surfaces of the electrode current collectors 611 and 621.

Figure 7:
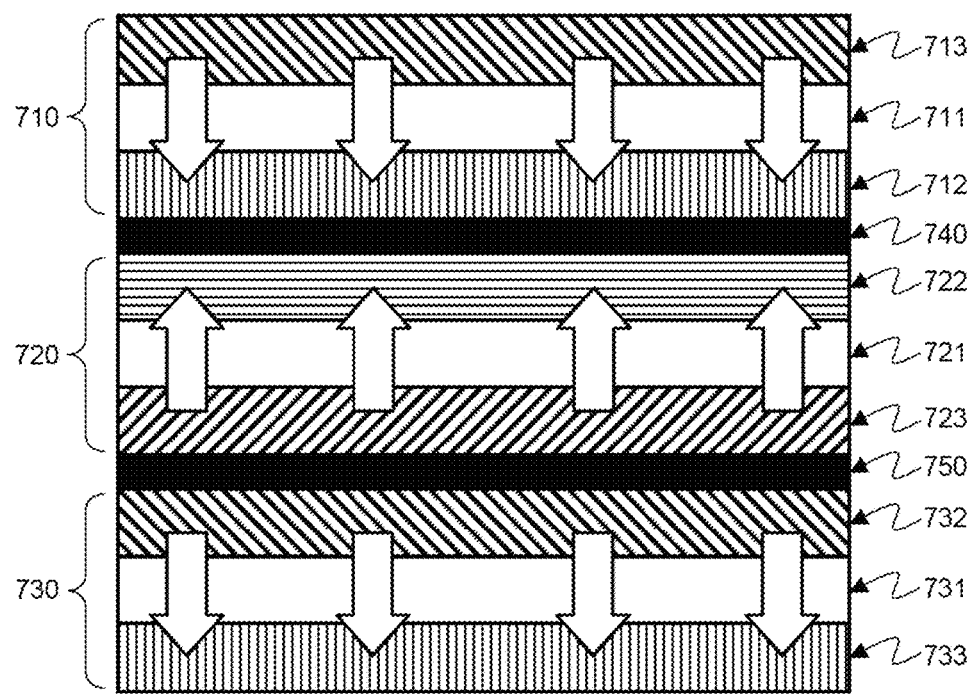
FIG. 7 is a typical view showing an electrode assembly that constitutes a secondary battery according to another embodiment of the present invention.

FIG. 7 is a typical view showing an electrode assembly that constitutes a secondary battery according to another embodiment of the present invention. The electrode assembly shown in this figure includes the positive electrode and the negative electrode shown in FIGS. 4 and 5.

Referring to FIG. 7, an electrode assembly 700 of the secondary battery includes positive electrodes 710 and 730, a negative electrode 720, and separators 740 and 750 interposed respectively between the positive electrode 710 and the negative electrode 720 and between the positive electrode 730 and the negative electrode 720. In the same manner as in the electrode assembly 600 shown in FIG. 6, positive electrode materials 712, 713, 732, and 733 having different outputs and capacities are added to the opposite major surfaces of positive electrode current collectors 711 and 731, and negative electrode materials 722 and 723 having different outputs and capacities are added to the opposite major surfaces of a negative electrode current collector 721.

Specifically, in the positive electrode 710 and the negative electrode 720, which face each other in a state in which the separator 740 is interposed between the positive electrode 710 and the negative electrode 720, the positive electrode material 712 added to one major surface of the positive electrode current collector 711 facing the separator 740 and the negative electrode material 722 added to one major surface of the negative electrode current collector 721 facing the separator 740 exhibit higher outputs and lower capacities than the electrode materials 713 and 723 added to the other major surfaces of the electrode current collectors 711 and 721. In addition, in the positive electrode 730 and the negative electrode 720, which face each other in a state in which the separator 750 is interposed between the positive electrode 730 and the negative electrode 720, the positive electrode material 732 added to one major surface of the positive electrode current collector 731 facing the separator 750 and the negative electrode material 723 added to one major surface of the negative electrode current collector 721 facing the separator 750 exhibit lower outputs and higher capacities than the electrode materials 733 and 723 added to the other major surfaces of the electrode current collectors 731 and 721.

In this case, cell balancing current, which flows between the high-output, low-capacity secondary batteries and the low-output, high-capacity secondary batteries in order to overcome imbalance in capacity between a plurality of secondary batteries having different outputs and capacities, which occurs in a conventional hybrid-type battery pack, and to improve the safety, lifespan, output, and capacity properties of the secondary batteries such that voltages of the secondary batteries are made uniform, flows directly through the electrode current collectors, not via electrode terminal connection parts.

In the secondary battery according to the present invention, therefore, it is possible to prevent deterioration of the secondary battery owing to heat generated from the electrode terminal connection parts, to improve the safety and durability of the secondary battery, and to prevent the loss of energy due to the resistance of the electrode terminal connection parts.

INDUSTRIAL APPLICABILITY

As is apparent from the above description, a secondary battery according to the present invention is configured such that electrode materials added to the opposite major surfaces of an electrode current collector exhibit different output and capacity properties and such that electrode materials added to one major surface of a positive electrode current collector and to one major surface of a negative electrode current collector, which faces the positive electrode current collector in a state in which a separator is interposed between the positive electrode current collector and the negative electrode current collector, exhibit higher capacities or lower capacities than electrode materials added to the other major surface of the positive electrode current collector and to the other major surface of the negative electrode current collector. As a result, cell balancing current, which flows between secondary batteries, flows directly through the electrode current collectors, not via electrode terminal connection parts. Consequently, it is possible to prevent deterioration of the secondary battery attributable to heat generated at the electrode terminal connection parts, to improve the safety and durability of the secondary battery, and to prevent the loss of energy due to the resistance of the electrode terminal connection parts.

The invention claimed is:

1. A secondary battery having an electrode assembly, comprising at least one positive electrode, at least one negative electrode, and at least one separator interposed between the positive electrode and the negative electrode, mounted in a battery case, wherein positive electrodes and negative electrodes having different output and capacity properties are provided in combination of a positive electrode and a negative electrode, positive electrode materials added to opposite major surfaces of a positive electrode current collector exhibit different output and capacity properties, negative electrode materials added to opposite major surfaces of a negative electrode current collector exhibit different output and capacity properties, and in the positive electrode and the negative electrode, which face each other in a state in which the separator is interposed between the positive electrode and the negative electrode, the positive electrode material added to one major surface of the positive electrode current collector facing the separator and the negative electrode material added to one major surface of the negative electrode current collector facing the separator exhibit higher capacities or lower capacities than the electrode materials added to the other major surfaces of the electrode current collectors in combination of the positive electrode and the negative electrode.

2. The secondary battery according to claim 1, wherein the electrode assembly is configured to have a wound type structure, a stacked type structure, a stacked and folded type structure, or a laminated and stacked type structure.

3. The secondary battery according to claim 1, wherein
the positive electrode comprises a relatively high-output, low-capacity positive electrode material added to one main surface of the positive electrode current collector and a relatively low-output, high-capacity positive electrode material added to the other main surface of the positive electrode current collector, and
the negative electrode comprises a relatively high-output, low-capacity negative electrode material added to one main surface of the negative electrode current collector and a relatively low-output, high-capacity negative electrode material added to the other main surface of the negative electrode current collector.

4. The secondary battery according to claim 3, wherein the electrode assembly is configured such that one major surface (a) of the positive electrode, to which the relatively high-output, low-capacity positive electrode material is added, and one major surface (b) of the negative electrode, to which the relatively high-output, low-capacity negative electrode material is added, face each other in a state in which the separator is interposed between the one major surface (a) of the positive electrode and the one major surface (b) of the negative electrode.

5. The secondary battery according to claim 3, wherein the electrode assembly is configured such that the other major surface (c) of the positive electrode, to which the relatively low-output, high-capacity positive electrode material is added, and the other major surface (d) of the negative electrode, to which the relatively low-output, high-capacity negative electrode material is added, face each other in a state in which the separator is interposed between the other major surface (c) of the positive electrode and the other major surface (d) of the negative electrode.

6. The secondary battery according to claim 3, wherein the relatively high-output, low-capacity positive electrode material is at least one selected from a group consisting of lithium manganese oxide (LMO), lithium iron phosphate (LFP), lithium nickel manganese cobalt oxide (NMC), and lithium nickel cobalt aluminum oxide (NCA).

7. The secondary battery according to claim 3, wherein the relatively low-output, high-capacity positive electrode material is at least one selected from a group consisting of lithium cobalt oxide (LCO), lithium nickel manganese cobalt oxide, lithium nickel cobalt aluminum oxide, and over-lithiated oxide (OLO).

8. The secondary battery according to claim 3, wherein the relatively high-output, low-capacity negative electrode material is at least one selected from a group consisting of amorphous carbon and a graphite-based negative electrode material.

9. The secondary battery according to claim 3, wherein the relatively low-output, high-capacity negative electrode material is at least one selected from a group consisting of a graphite-based negative electrode material, a silicon (Si)-based negative electrode material, and a tin (Sn)-based negative electrode material.

10. The secondary battery according to claim 3, wherein the relatively high-output, low-capacity positive electrode material and the relatively low-output, high-capacity positive electrode material are identical in kind to each other, and a porosity of the relatively high-output, low-capacity positive electrode material has 110% to 300% of a porosity of the relatively low-output, high-capacity positive electrode material.

11. The secondary battery according to claim 3, wherein the relatively high-output, low-capacity positive electrode material and the relatively low-output, high-capacity positive electrode material are identical in kind to each other, and an amount of the relatively high-output, low-capacity positive electrode material coated on the positive electrode current collector is 50% to 90% of an amount of the relatively low-output, high-capacity positive electrode material coated on the positive electrode current collector.

12. The secondary battery according to claim 3, wherein the relatively high-output, low-capacity negative electrode material and the relatively low-output, high-capacity negative electrode material are identical in kind to each other, and a porosity of the relatively high-output, low-capacity negative electrode material is 110% to 300% of a porosity of the relatively low-output, high-capacity negative electrode material.

13. The secondary battery according to claim 3, wherein the relatively high-output, low-capacity negative electrode material and the relatively low-output, high-capacity negative electrode material are identical in kind to each other, and an amount of the relatively high-output, low-capacity negative electrode material coated on the negative electrode current collector is 50% to 90% of an amount of the relatively low-output, high-capacity negative electrode material coated on the negative electrode current collector.

14. The secondary battery according to claim 1, wherein the electrode materials exhibiting different output and capacity properties are different from each other in terms of kind of the electrode materials, a coating method, porosity, a coating amount, or a mixing ratio.

15. The secondary battery according to claim 1, wherein the positive electrode material or the negative electrode material is at least one selected from among an electrode material for nickel metal hydride secondary batteries, an electrode material for nickel cadmium secondary batteries, and an electrode material for capacitors.

16. The secondary battery according to claim 1, wherein, when the positive electrode material or the negative electrode material is added to the electrode current collector, an adhesive material for increasing adhesion force between the positive electrode material or the negative electrode material and the electrode current collector is further added to the electrode current collector.

17. The secondary battery according to claim 1, wherein the electrode assembly is manufactured through a manufacturing process comprising high-temperature, high-pressure pressing.

18. The secondary battery according to claim 1, wherein the separator comprises one or more kinds of separators.

19. A battery pack comprising a secondary battery according to claim 1 as a unit cell.

20. The battery pack according to claim 19, wherein the battery pack further comprises a cooling member.

21. A device comprising a battery pack according to claim 19.

22. The device according to claim 21, wherein the device is selected from a group consisting of a laptop computer, a mobile phone, a portable display player (PDP), a portable multimedia player (PMP), an MP3 player, a digital still camera (DSC), a digital video recorder (DVR), a smartphone, a global positioning system (GPS), a camcorder, an electric vehicle, a hybrid electric vehicle, a plug-in hybrid electric vehicle, and a power storage device.

\* \* \* \* \*